US009969825B2

(12) United States Patent
Jasra et al.

(10) Patent No.: US 9,969,825 B2
(45) Date of Patent: May 15, 2018

(54) POLYMERIZATION OF HYDROCARBONS

(71) Applicant: Reliance Industries Limited, Mumbai (IN)

(72) Inventors: Raksh Vir Jasra, Gujarat (IN); Ninad Deepak Ingle, Pune (IN); Pradeep Paresh Kapadia, Mumbai (IN); Pradip Munshi, Gujarat (IN)

(73) Assignee: Reliance Industries Limited, Mumbai (IN)

( * ) Notice: Subject to any disclaimer, the term of this patent is extended or adjusted under 35 U.S.C. 154(b) by 0 days. days.

(21) Appl. No.: 15/029,957

(22) PCT Filed: Oct. 16, 2014

(86) PCT No.: PCT/IN2014/000655
§ 371 (c)(1),
(2) Date: Apr. 15, 2016

(87) PCT Pub. No.: WO2015/075733
PCT Pub. Date: May 28, 2015

(65) Prior Publication Data
US 2016/0244541 A1 Aug. 25, 2016

(30) Foreign Application Priority Data
Oct. 18, 2013 (IN) .......................... 3272/MUM/2013

(51) Int. Cl.
*C08F 136/08* (2006.01)
*C08F 2/48* (2006.01)
(Continued)

(52) U.S. Cl.
CPC .......... *C08F 136/08* (2013.01); *B01J 19/127* (2013.01); *C08F 2/48* (2013.01); *C08F 120/06* (2013.01);
(Continued)

(58) Field of Classification Search
CPC ........ C08F 2/48; C08F 120/06; C08F 136/08; B01J 19/127; B01J 2219/0869; B01J 2219/1203
See application file for complete search history.

(56) References Cited

U.S. PATENT DOCUMENTS 2,857,322 A * 10/1958 Lard ....................... C08F 20/00
522/177
3,859,189 A * 1/1975 Murgulescu ............ C08F 20/00
522/177
(Continued)

FOREIGN PATENT DOCUMENTS

EP 0396780 A1 11/1990
EP 0438287 A2 7/1991
(Continued)

OTHER PUBLICATIONS

International Search Report issued in PCT/IN2013/000655 dated Sep. 14, 2015 (2 pages).
(Continued)

Primary Examiner — Sanza Mcclendon
(74) Attorney, Agent, or Firm — Osha Liang LLP

(57) ABSTRACT

The present disclosure relates to a process for polymerization of hydrocarbons. In accordance with the process of the present disclosure, a hydrocarbon and a photo-initiator is introduced in a reaction vessel and then agitated for a predetermined time period. In the next step, the reaction vessel containing the agitating hydrocarbon and the photo-initiator is irradiated with visible light to obtain a polymerized hydrocarbon. The process of present disclosure is carried out in an atmosphere containing oxygen less than 0.65% in the reaction vessel.

11 Claims, 2 Drawing Sheets

(51) Int. Cl.
*C08F 120/06* (2006.01)
*B01J 19/12* (2006.01)
(52) U.S. Cl.
CPC .................. *B01J 2219/0869* (2013.01); *B01J 2219/1203* (2013.01)

(56) References Cited

U.S. PATENT DOCUMENTS

| | | | | |
|---|---|---|---|---|
| 4,325,794 A | * | 4/1982 | Hunter | B29C 41/28 522/173 |
| 2004/0048945 A1 | * | 3/2004 | Ueshima | C08F 8/22 522/114 |
| 2014/0309325 A1 | * | 10/2014 | Inaoka | C08F 8/22 522/132 |

FOREIGN PATENT DOCUMENTS

| | | | |
|---|---|---|---|
| EP | 0441485 | A2 | 8/1991 |
| EP | 0634442 | A1 | 1/1995 |

OTHER PUBLICATIONS

Written Opinion of the International Searching Authority issued in PCT/IN2013/000655 dated Sep. 14, 2015 (7 pages).

* cited by examiner

POLYMERIZATION OF HYDROCARBONS

This application is a Divisional Patent Application to the Indian Patent Application No. 3049/MUM/2012 filed on 18 Oct. 2012 the entire contents of which are specifically incorporated herein by reference.

FIELD

The present invention relates to a process and an apparatus for polymerizing hydrocarbons.

BACKGROUND

Polymerization is a process of reacting monomer molecules together in a chemical reaction to form linear chains or a three-dimensional network of polymer chains. Conventional processes for polymerization include radical polymerization, cationic polymerization, anionic polymerization, photo-irradiation polymerization and coordination catalytic polymerization In general, photo-irradiation polymerization process utilizes UV light emitted by various sources such as a filament-based lamp, vapor/gas-based lamp and the like. However, the filament-based or vapor/gas-based lamp used as a source of UV light emits defused or multi-directional UV light that exhibits a high rate of intensity decay with distance. Therefore, these lamps are incapable of inducing effective reactions which further lead to consumption of high amount of electrical power. Additionally, these lamps are bulky and have a short life period (8000-15000 hours).

Further, the use of such light sources may cause short and long term health hazards by way of scattered UV radiations in the immediate environment. Furthermore, reaction vessels made of quartz make the chemical process and its apparatus expensive.

Thus, there is a need for a novel and economic process for polymerization of hydrocarbons. Further, there is also a need for an apparatus which will utilize low-intensity solid state lights for polymerization of hydrocarbons.

OBJECTS

Some of the objects of the system of the present disclosure, which at least one embodiment discussed herein satisfies, are as follows:

It is an object of the present disclosure to ameliorate one or more problems of the state-of-the-art or at least provide a useful alternative.

It is an object of the present disclosure to provide a process for polymerization of hydrocarbons which is economical.

It is another object of the present disclosure to provide a process for polymerization of hydrocarbons which is environmentally safe.

It is a still another object of the present disclosure to provide a process for polymerization of hydrocarbons which utilizes Light Emitting Diodes (LEDs) as a source of visible light.

It is a still another object of the present invention to provide a process for polymerization of hydrocarbons without addition of an additive like swelling and dispersing agents.

It is a further object of the present disclosure to provide an apparatus for polymerization of hydrocarbons.

It is still a further object of the present disclosure to provide an apparatus for polymerization of hydrocarbons which is energy efficient and economic.

It is even a further object of the present disclosure to provide an apparatus for polymerization of hydrocarbons which is easy to handle.

SUMMARY

The present disclosure provides a process for polymerization of a hydrocarbon comprises reacting, under agitation, the hydrocarbon and a photo-initiator in an atmosphere containing oxygen less than 0.65% in a reaction vessel by passing visible light of wavelength ranging from 390 to 780 nm emitted by at least one light source, into the reaction vessel for a predetermined time period to obtain a polymerized hydrocarbon. In accordance with another aspect of the present disclosure there is provided an apparatus for polymerization of a hydrocarbon. The apparatus of the present disclosure comprises a reaction vessel, a purging means to purge fluids into said reaction vessel, a guiding means to guide the light to a reaction zone of the reaction vessel, a centrally mounted stirrer and at least one light source.

DETAILED DESCRIPTION

Figure 1A:
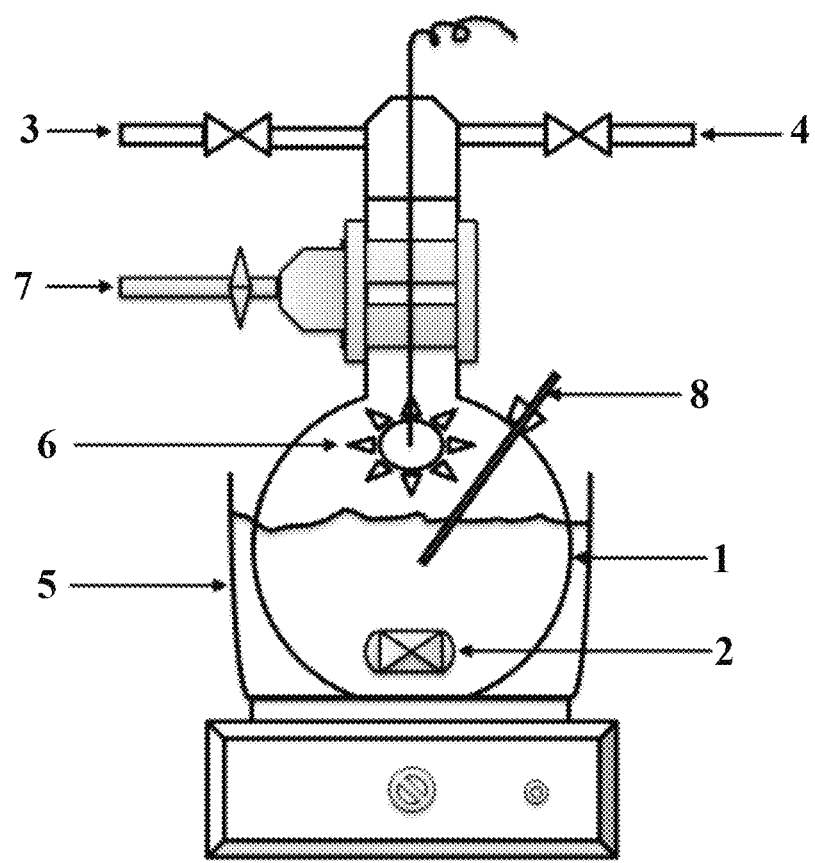
FIGS. 1(a) and 1(b) illustrate schematic illustration of the apparatus used for polymerization of hydrocarbons with light source placed inside and outside the reaction vessel respectively.

In accordance with the present disclosure there is provided a process for polymerization of a hydrocarbon. The process involves the following steps:

In the first step, at least one hydrocarbon and at least one photo-initiator is introduced in an atmosphere containing oxygen less than 0.65% into a reaction vessel and the mixture is agitated for a predetermined period of time.

Hydrocarbons used in accordance with the present disclosure include but are not limited to isoprene, acrylic acid alcohol, epoxide, hydroxyacid, lactum and vinyl monomers. The hydrocarbon can be introduced in the reaction vessel in the form of a slurry or a solution. In one embodiment of the present disclosure the hydrocarbon is in the form of slurry.

In accordance with the present disclosure the hydrocarbon is heated at a temperature of 40 to 90° C. before passing visible light into the reaction vessel.

The photo-initiator used the present disclosure includes but is not limited to one or more peroxides selected from the group consisting of hydrogen peroxide, benzoyl peroxide t-butylhydroperoxide, perbenzoic acid and peracetic acid. The amount of photo-initiator used in the process of present disclosure ranges from 20 to 800 ppm.

A low oxygen level is maintained in the reaction vessel. In the process of present disclosure the oxygen is less than 0.65% in the reaction vessel. Oxygen can be removed when introducing hydrocarbon in the reaction vessel or during the step of agitating the mixture of hydrocarbon and photo-initiator in the reaction vessel. The oxygen must be removed from the reaction vessel, as oxygen hinders the photo-initiated polymerization process.

In accordance with the present disclosure the method step of agitation is carried out with the help of a rotating stirrer at speeds ranging from 200 to 850 rpm for a time period of 5 to 60 minutes.

Typically, an atmosphere containing oxygen less than 0.65% is established in the reaction vessel by purging an inert gas and subsequently visible light is passed for a period of 2 to 12 hours into the reaction vessel to obtain the polymerized hydrocarbon.

The light source, from which the visible light of wavelength 390 to 780 nm is emitted, is a bank of solid state light emitting devices. Non limiting examples of the solid state light emitting devices includes but not limited to Light Emitting Diodes (LEDs), LASER, Organic Electroluminescence material, Inorganic Electroluminescence, Organic Light Emitting Diodes and Inorganic Light Emitting Diodes.

The light source is placed on at least one location selected from the group consisting of outside the reaction vessel, inside the reaction vessel and embedded on the walls of the reaction vessel.

The distance between the exterior wall of the reaction vessel and the light source, placed outside the reaction vessel is in the range of 0.2 to 12 cm, preferably at a distance of 0.5 to 4 cm.

The step of passing light from a light source placed outside the reaction vessel includes guiding the beam of light to a reaction zone of reaction vessel in which the process is taking place.

Figure 1B:
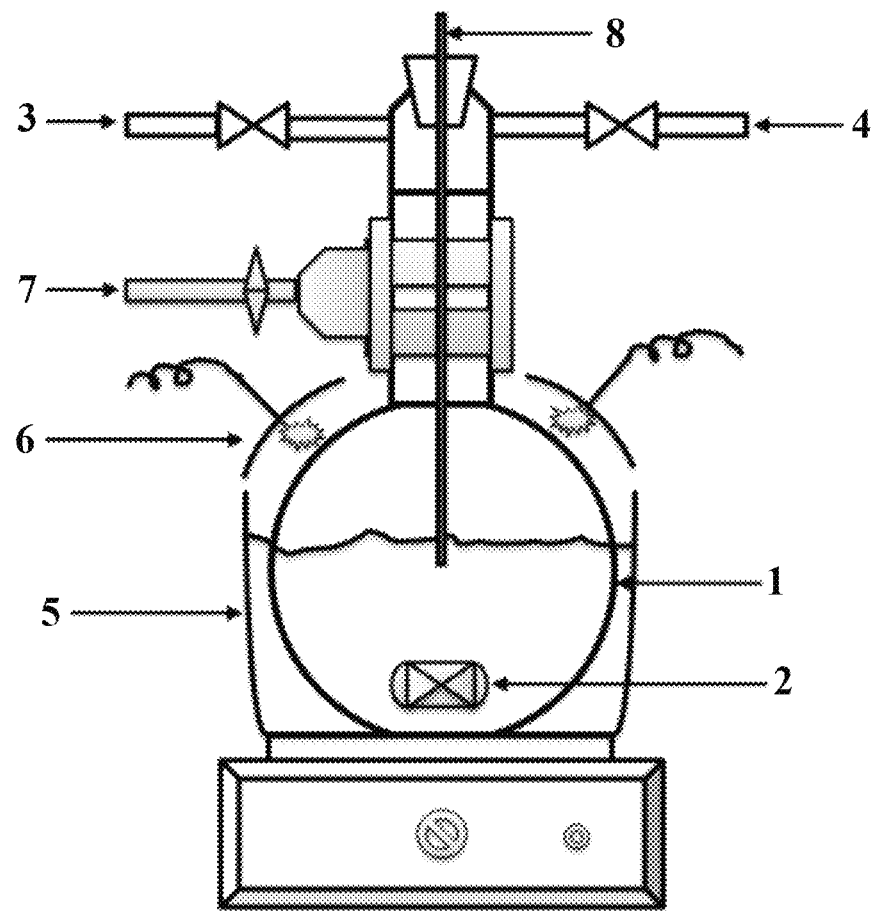

In accordance with the present disclosure there is also provided an apparatus for polymerization of hydrocarbons. As shown in the FIG. 1(a) in one embodiment, the apparatus includes a reaction vessel 1, purging means 3 and 4 to purge fluids into the reaction vessel, a centrally mounted stirrer 2 and at least one light source 6 placed inside the reaction vessel. The temperature in the reaction vessel is measured and maintained using a thermometer and heating bath 8 and 5 respectively. The apparatus of the present discloser also includes guiding means to guide the light from the light source to a reaction zone in the reaction vessel. The guiding means includes but is not limited to waveguide, lens and set of lenses. The entire set-up is supported using a clamping arrangement 7. In second embodiment as shown in FIG. 1(b), the light source 6 is placed outside the reaction vessel keeping rest of the elements of the apparatus same as in the first embodiment.

The light source, from which the visible light of wavelength 390 to 780 nm is emitted, is solid state light emitting devices which includes but not limited to Light Emitting Diodes (LEDs), LASER, Organic Electroluminescence material, Inorganic Electroluminescence, Organic Light Emitting Diodes, Inorganic Light emitting Diodes and combinations thereof.

In accordance with the present disclosure the light source is placed on at least one location selected from the group consisting of outside the reaction vessel, inside the reaction vessel and embedded on the walls of the reaction vessel.

The distance between the exterior wall of the reaction vessel and the bank of LEDs placed outside the reaction vessel is in the range of 0.2 to 12 cm, preferably at a distance of 0.5 to 4 cm. Typically, the reaction vessel is glass walled and transparent.

The present disclosure is further illustrated herein below with the help of the following examples. The examples used herein are intended merely to facilitate an understanding of ways in which the embodiments herein may be practiced and to further enable those of skill in the art to practice the embodiments herein. Accordingly, the examples should not be construed as limiting the scope of embodiments herein.

Example 1: Radical-Initiated Polymerization of a Monomer

An aqueous solution of 10 ml of partially neutralized acrylic acid and 1.6 g of benzoyl peroxide were added to a round bottom flask and continuously stirred using a magnetic stirrer. The temperature of the mixture was maintained at 50° C. Nitrogen gas was then purged in the round bottom flask for maintaining an atmosphere containing oxygen less than 0.60% in the reaction vessel. Subsequently, the mixture was exposed to light emitted by one or more light emitting devices. The start time of the reaction was noted from the time the mixture was exposed to the LED light having wavelength of 405 nm. At the end of 4 hours, formation of polyacrylic acid was confirmed by Nuclear Magnetic Resonance (NMR) and Gel Permeation Chromatography (GPC).

Example 2: Radical-Initiated Polymerization of an Unsaturated Hydrocarbon 10 ml of isoprene, 50 ml toluene and 1 ml hydrogen peroxide were added to a round bottom flask and continuously stirred using a magnetic stirrer. The temperature of the mixture was maintained at 50° C. Nitrogen gas was then purged in the round bottom flask for maintaining an atmosphere containing oxygen less than 0.65% in the reaction vessel. The mixture was exposed to light emitted by one or more light emitting devices. The start time of the reaction was noted from the time the mixture was exposed to the LED light having wavelength of 405 nm. At the end of 4 hours, formation of poly-isoprene was confirmed.

Example 3: Radical-Initiated Polymerization of an Unsaturated Hydrocarbon in the Absence of Inert Gas Purging 10 ml of isoprene, 50 ml toluene and 1 ml hydrogen peroxide were added to a round bottom flask and continuously stirred using a magnetic stirrer. The temperature of the mixture was maintained at 50° C. The mixture was exposed to light emitted by one or more light emitting devices. The start time of the reaction was noted from the time the mixture was exposed to the LED light having wavelength of 405 nm. At the end of 8 hours, only formation of trace amount of poly-isoprene was seen, which was significantly less than that in example 2.

Technical Advantages

The present disclosure provides the process for polymerizing hydrocarbons that is carried out without addition of an additive.

The process for polymerizing hydrocarbons is carried out in solid state light emitting devices.

The process for the polymerizing hydrocarbons is simple and cost effective and environmentally safe.

The present disclosure also provides an apparatus for polymerizing hydrocarbons.

The exemplary embodiments herein quantify the benefits arising out of this disclosure and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for polymerization of a hydrocarbon; said process comprising reacting, under agitation, the hydrocarbon and a photo initiator, in an atmosphere containing oxygen less than 0.65% in a reaction vessel by passing visible light of wavelength ranging from 390 to 780 nm emitted by at least one light source, into the reaction vessel for a predetermined time period to obtain a polymerized hydrocarbon;
    wherein the photo-initiator is at least one peroxide selected from the group consisting of hydrogen peroxide, benzoyl peroxide, t-butylhydroperoxide, per-benzoic acid and per-acetic acid;
    wherein the amount of the photo-initiator is in the range of 20 to 800 ppm; and
    wherein the at least one light source is at least one solid state light emitting device selected from the group consisting of Light Emitting Diodes (LEDs), LASER, Organic Electroluminescence material, Inorganic Electroluminescence, Organic Light Emitting Diodes and Inorganic Light Emitting Diodes.

2. A process for polymerization of a hydrocarbon as claimed in claim 1; said process comprising the following steps:
    i. introducing the hydrocarbon in the reaction vessel having an atmosphere containing oxygen less than 0.65%;
    ii. introducing the photo-initiator in the reaction vessel;
    iii. agitating the hydrocarbon and the photo-initiator in the reaction vessel for a second predetermined time period; and
    iv. passing the visible light of wavelength ranging from 390 to 780 nm emitted by the at least one light source, into the reaction vessel for the predetermined time period to obtain a polymerized hydrocarbon.

3. A process for polymerization of a hydrocarbon as claimed in claim 1; said process comprising the following steps:
    i. introducing the hydrocarbon in the reaction vessel;
    ii. introducing the photo-initiator in the reaction vessel;
    iii. agitating the hydrocarbon and the photo-initiator in the reaction vessel for a second predetermined time period;
    iv. establishing an atmosphere containing oxygen less than 0.65% in the reaction vessel in which the hydrocarbon and the photo initiator is being agitated; and
    v. passing the visible light of wavelength ranging from 390 to 780 nm emitted by the at least one light source, into the reaction vessel for a predetermined time period to obtain a polymerized hydrocarbon.

4. The process as claimed in claim 1, wherein the hydrocarbon is at least one monomer selected from the group consisting of isoprene, vinyl monomers, and derivatives of hydrocarbon selected from acrylic acid, epoxide, hydroxy-acid, and lactam.

5. The process as claimed in claim 1, wherein the hydrocarbon is introduced in the reaction vessel in the form of slurry or a solution.

6. The process as claimed in claim 1, wherein the method step of agitation is carried out with the help of a rotating stirrer at speeds ranging from 200 to 850 rpm for a time period of 5 to 60 minutes.

7. The process as claimed in claim 1, wherein the visible light is passed into the reaction vessel for a time period of 2 to 12 hours.

8. The process as claimed in claim 1, wherein the at least one light source from which light is passed is placed on at least one location selected from the group consisting of outside the reaction vessel, inside the reaction vessel and embedded on the walls of the reaction vessel.

9. The process as claimed in claim 1, wherein the at least one light source from which light is passed is placed outside the reaction vessel at a distance of 0.2 to 12 cm from the exterior wall of the reaction vessel.

10. The process as claimed in claim 1, wherein the step of passing visible light includes guiding the beam of light to a reaction zone in the reaction vessel in which the process is taking place.

11. The process as claimed in claim 1 further comprising the step of heating the agitating hydrocarbon at a temperature ranging from 40 to 90° C. before passing said visible light into the reaction vessel.

* * * * *